J. F. ALT.
FLOWER POTS.
No. 193,908. Patented Aug. 7, 1877.
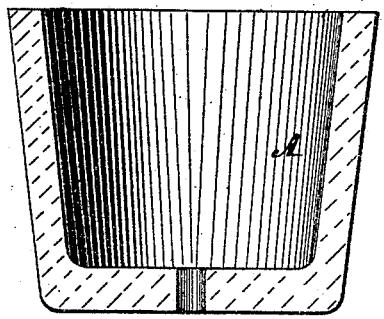
Witnesses.
F. Broaun.
Ehret.
Inventor.
John F. Alt
per Henry E. Roeder
Attorney.

UNITED STATES PATENT OFFICE.

JOHN F. ALT, OF NEW YORK, N. Y.

IMPROVEMENT IN FLOWER-POTS.

Specification forming part of Letters Patent No. 193,908, dated August 7, 1877; application filed August 31, 1876.

*To all whom it may concern:*

Be it known that I, JOHN F. ALT, of New York, in the State of New York, have invented a new and useful Flower-Pot, of which the following is a specification:

The object of my invention is to manufacture small flower-pots, such as are used for propagation of plants, of a fertilizing material, which will easily decompose when placed into the earth, so as to prevent the necessity of taking the young plant out of the pot when the same is to be planted into the ground.

My said invention consists in a flower-pot formed of a compound of fertilizing material, as the excrement of cattle and earthy matter, as hereinafter fully described.

In the accompanying drawing, A represents a section of my improved flower-pot.

I take about two-third parts of the excrement of cattle, or other fertilizer, and about one-third part of earth, and mix the same well together. Of the excrements, I prefer that of cows. When the same is fresh and new no fluid will be required to form a perfect adhesion of the plastic mass; but if the fertilizer is old and dry, a little addition of water will make the mass more plastic. This mass is then put into a suitable mold or form and the flower-pot pressed in the desired shape and size, and afterward dried in the air or a hot room.

This flower-pot will answer all purposes for raising plants from seeds, or by propagation during the winter, in the room or hot-house, while in the spring, when the plants are put into the ground, the same can be inserted with the plant into the earth, where the moisture of the ground will soon decompose the material from which the pot was made, and thus furnish, at the same time, the required nutriment to the plant.

What I claim as my invention, and desire to secure by Letters Patent, is—

A transplanting or flower pot formed of a mixture of earthy matter and a soluble fertilizing material, so that when said pot with the contained plant is set in the ground the fertilizer will dissolve, thus destroying the integrity of the pot, and at the same time yielding nourishment to the root of the growing plant, substantially as and for the purpose set forth.

JOHN F. ALT.

Witnesses:
HENRY E. ROEDER,
J. B. NONES.